(12) United States Patent
Suzuki et al.

(10) Patent No.: US 11,885,226 B2
(45) Date of Patent: Jan. 30, 2024

(54) STEAM VALVE, AND STEAM TURBINE EQUIPMENT COMPRISING SAME

(71) Applicant: MITSUBISHI HEAVY INDUSTRIES, LTD., Tokyo (JP)

(72) Inventors: Fumiyuki Suzuki, Yokohama (JP);
Masaki Hata, Yokohama (JP);
Megumu Tsuruta, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/921,162

(22) PCT Filed: Apr. 28, 2021

(86) PCT No.: PCT/JP2021/016966
§ 371 (c)(1),
(2) Date: Oct. 25, 2022

(87) PCT Pub. No.: WO2021/230086
PCT Pub. Date: Nov. 18, 2021

(65) Prior Publication Data
US 2023/0167749 A1  Jun. 1, 2023

(30) Foreign Application Priority Data

May 14, 2020  (JP) ................. 2020-085245

(51) Int. Cl.
*F01D 17/14* (2006.01)
*F16K 31/52* (2006.01)

(52) U.S. Cl.
CPC ............ *F01D 17/145* (2013.01); *F16K 31/52* (2013.01); *F05D 2220/31* (2013.01)

(58) Field of Classification Search
CPC ........ F01D 17/18; F01D 17/145; F01D 17/10; F05D 2220/31; F16K 31/52
See application file for complete search history.

(56) References Cited

U.S. PATENT DOCUMENTS 1,407,041 A * 2/1922 Peterson ............... G05D 13/00
  417/22
3,529,630 A * 9/1970 Podolsky ................. F16K 1/44
  137/630.14
(Continued)

FOREIGN PATENT DOCUMENTS

JP    S64-000668 A    1/1989
JP    H04-224206 A    8/1992
(Continued)

OTHER PUBLICATIONS

International Search Report dated Jun. 22, 2021, issued in counterpart Application No. PCT/JP2021/016966, with English Translation. (5 pages).

(Continued)

*Primary Examiner* — Courtney D Heinle
*Assistant Examiner* — Andrew Thanh Bui
(74) *Attorney, Agent, or Firm* — WHDA, LLP

(57) ABSTRACT

This steam valve includes a valve casing, a valve body, a valve stem, an actuator, a heat buffer member, a link mechanism, and a link base. The heat buffer member includes: a heat buffer plate separated toward a leading end side from the valve casing in an axial direction in which the valve stem extends; and a support column that fixes the heat buffer plate to the valve casing so as to be incapable of relative movement. The actuator includes: an actuator casing; and an actuator rod that extends in the axial direction from in the actuator casing and that moves in the axial direction with respect to the actuator casing. The link base is fixed to the heat buffer member and extends from the heat buffer member in an axial perpendicular direction that is perpendicular to the axial direction. The actuator casing is fixed to the link base.

6 Claims, 3 Drawing Sheets

(56) References Cited

U.S. PATENT DOCUMENTS

| | | | |
|---|---|---|---|
| 4,740,867 A | 4/1988 | Roberts et al. | |
| 2015/0204215 A1 | 7/2015 | Chowdhury | |
| 2015/0322812 A1 | 11/2015 | Futahashi et al. | |
| 2016/0123179 A1 | 5/2016 | Takemura | |
| 2018/0340627 A1* | 11/2018 | Futahashi | ............... F01D 17/18 |

FOREIGN PATENT DOCUMENTS

| | | | |
|---|---|---|---|
| JP | 2002-097903 A | 4/2002 |
| JP | 2013-189864 A | 9/2013 |
| JP | 6058028 B2 | 1/2017 |
| KR | 101823885 B1 | 1/2018 |
| WO | 2015/125236 A1 | 8/2015 |

OTHER PUBLICATIONS

Written Opinion dated Jun. 22, 2021, issued in counterpart Application No. PCT/JP2021/016966, with English Translation. (6 pages).

* cited by examiner

STEAM VALVE, AND STEAM TURBINE EQUIPMENT COMPRISING SAME

TECHNICAL FIELD

The present disclosure relates to a steam valve, and steam turbine equipment provided with the steam valve.

This application claims the right of priority based on Japanese Patent Application No. 2020-085245 filed on May 14, 2020, the entire content of which is incorporated herein by reference.

BACKGROUND ART

As a steam valve for adjusting the flow rate of steam that is supplied to a steam turbine, there is a steam valve disclosed in PTL 1 below, for example. This steam valve includes a valve casing in which a flow path for steam is formed, a valve body that opens and closes the flow path, a valve stem connected to the valve body, and an actuator that moves the valve stem. A link mechanism that transmits an operation of the actuator to the valve stem is provided between the actuator and the valve stem. The link mechanism includes a lever that connects the valve stem and the actuator. An intermediate portion of the lever is rotatably connected to a tip portion of the valve stem. One end portion of the lever is connected to an actuator rod. The valve stem extends in a moving direction of the valve body. The actuator rod is parallel to the valve stem. That is, the actuator rod extends in an axial direction in which the valve stem extends. When the actuator rod moves to one of one side and the other side in the axial direction, one end portion of the lever also moves to one side in the axial direction. As a result, the intermediate portion of the lever and the valve stem move to one side in the axial direction.

CITATION LIST

Patent Literature

[PTL 1] Japanese Unexamined Patent Application Publication No. 2002-097903

SUMMARY OF INVENTION

Technical Problem

Since steam that is supplied to the steam turbine flows through the steam valve, the temperature of the valve body or of the valve stem rises due to the heat of the steam. In the technique described in PTL 1, the heat due to the steam is transmitted to the link mechanism through the valve stem. As a result, there is a concern that thermal expansion may occur in the link mechanism, resulting in malfunction of the link mechanism.

Therefore, the present disclosure has an object to provide a technique capable of suppressing the occurrence of malfunction due to the influence of heat.

Solution to Problem

In order to solve the above problem, according to an aspect of the present disclosure, there is provided a steam valve including: a valve casing in which a flow path for steam is formed inside; a valve body that linearly reciprocates in the valve casing to open and close the flow path; a valve stem connected to the valve body; an actuator that moves the valve stem; a heat buffer member mounted to the valve casing; a link mechanism that transmits an operation of the actuator to the valve stem; and a link base that supports the link mechanism, in which the valve stem has a base end portion connected to the valve body and a tip portion located outside the valve casing, and extends in a moving direction of the valve body from the base end portion, the heat buffer member includes a heat buffer plate separated from the valve casing toward a tip side, which is a side of the tip portion with respect to the base end portion in an axial direction in which the valve stem extends, out of the tip side and a base end side on a side opposite to the tip side, and a support column that fixes the heat buffer plate to be immovable relative to the valve casing, the actuator includes an actuator casing, and an actuator rod that extends in the axial direction from an inside of the actuator casing and that moves in the axial direction with respect to the actuator casing, the link base is fixed to the heat buffer member and extends from the heat buffer member in an axis-perpendicular direction perpendicular to the axial direction, the actuator casing is fixed to the link base, and the link mechanism is disposed on the tip side with respect to an edge on the base end side of the link base.

According to another aspect of the present disclosure, there is provided steam turbine equipment including: the steam valve as described above; and a steam turbine that is driven by steam that has passed through the steam valve.

According to still another aspect of the present disclosure, there is provided a link support component of a steam valve that includes a valve casing in which a flow path for steam is formed inside, a valve body that linearly reciprocates in the valve casing to open and close the flow path, a valve stem connected to the valve body, an actuator that moves the valve stem, and a link mechanism that transmits an operation of the actuator to the valve stem.

The link support component includes a heat buffer member capable of being mounted to the valve casing, and a link base capable of supporting the link mechanism. The heat buffer member includes a heat buffer plate separated from the valve casing toward a tip side out of the tip side and a base end side in an axial direction in which the valve stem extends, and a support column that extends in the axial direction and that fixes the heat buffer plate to be immovable relative to the valve casing. The heat buffer plate is provided with an insertion hole which penetrates in the axial direction, and into which the valve stem is capable of being inserted. The link base includes a separation member fixed to the heat buffer member and extending from the heat buffer member toward a first side in an axis-perpendicular direction perpendicular to the axial direction, and an actuator fixing plate that is directly or indirectly fixed to an end portion on the first side of the separation member, and to which a casing of the actuator is capable of being fixed. The actuator fixing plate is provided with a rod insertion hole which penetrates in the axial direction, and into which an actuator rod of the actuator is capable of being inserted. The separation member is provided with a pin mounting portion to which a pin for rotatably supporting one link of the link mechanism is mounted.

Advantageous Effects of Invention

According to an aspect of the present disclosure, it becomes possible to suppress the occurrence of malfunction due to the influence of heat.

DESCRIPTION OF EMBODIMENTS

Hereinafter, an embodiment of the present invention and a modification example thereof will be described in detail with reference to the drawings.

In an embodiment of a steam valve according to the present invention and steam turbine equipment provided with the steam valve, the steam turbine equipment will be described with reference to FIG. 1.

Configuration of Steam Turbine Equipment

Figure 1:
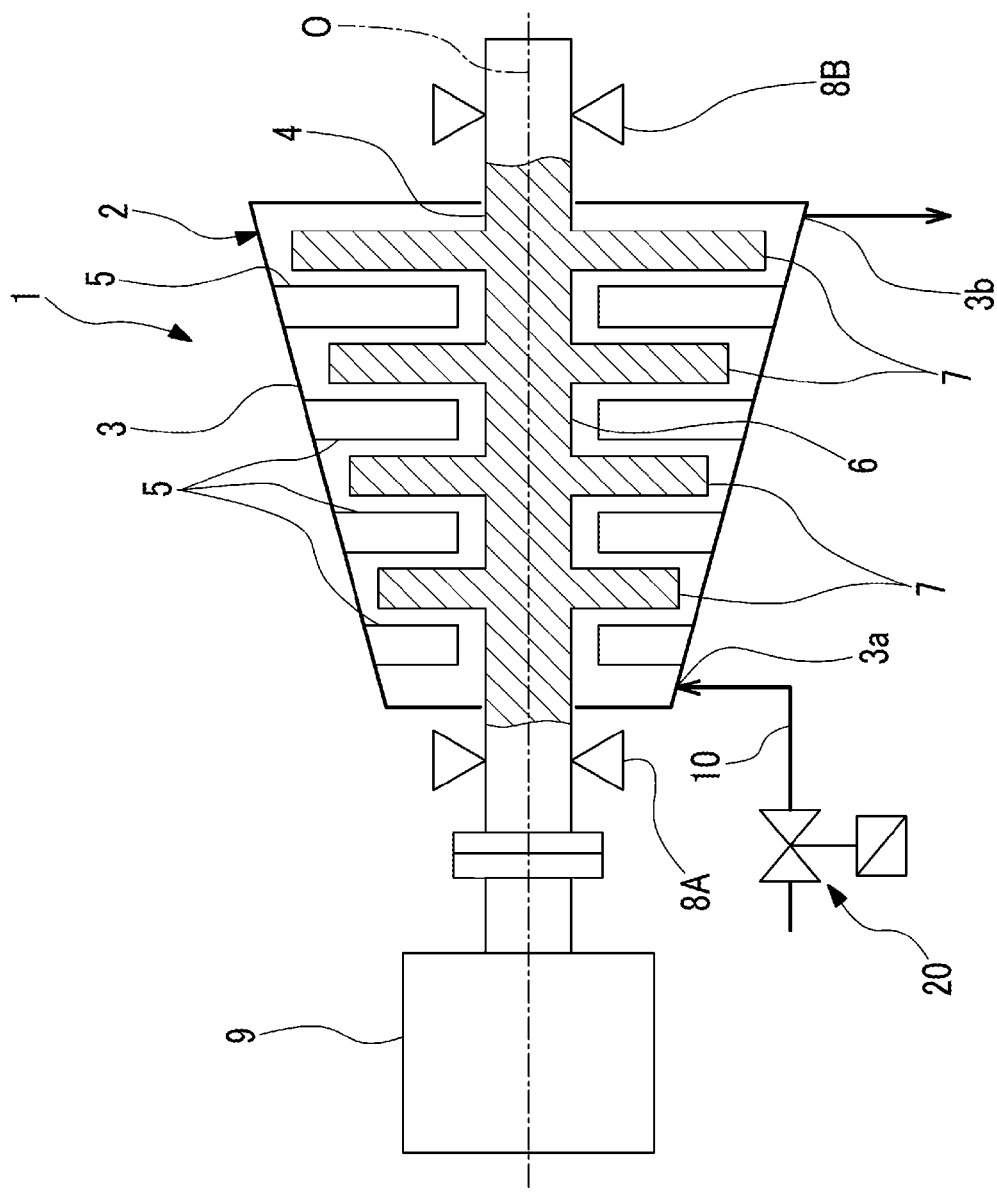
FIG. 1 is an explanatory diagram showing a schematic configuration of steam turbine equipment according to an embodiment of the present disclosure.

As shown in FIG. 1, steam turbine equipment 1 mainly includes a steam turbine 2 that is driven by steam, and a steam valve 20.

The steam turbine 2 includes a casing 3 and a rotor 4.

The casing 3 has a tubular shape extending in a direction of a central axis O of the rotor 4. In the casing 3, a steam inlet 3a is formed on a first side in the direction of the central axis O. In the casing 3, a steam outlet 3b is formed on a second side in the direction of the central axis O. A plurality of stator blade rows 5 are provided within the casing 3 at intervals in the direction of the central axis O. Each of the stator blade rows 5 extends inward in a radial direction from an inner peripheral surface of the casing 3. Each of the stator blade rows 5 is composed of a plurality of stator blades that are arranged in a circumferential direction around the central axis O.

The rotor 4 includes a rotor shaft 6 and a rotor blade row 7. The rotor shaft 6 is provided to penetrate the inside of the casing 3 in the direction of the central axis O. Both end portions of the rotor shaft 6 are supported by bearings 8A and 8B so as to be rotatable around the central axis O. A plurality of the rotor blade rows 7 are provided integrally with the rotor shaft 6 at intervals in the direction of the central axis O. The stator blade rows 5 and the rotor blade rows 7 are alternately arranged in the direction of the central axis O in the casing 3. Each of the rotor blade rows 7 extends outward in the radial direction from an outer peripheral surface of the rotor shaft 6. Each of the rotor blade rows 7 is composed of a plurality of rotor blades that are arranged in the circumferential direction around the central axis O.

In the steam turbine 2, steam that is supplied from a steam supply source such as a boiler (not shown) is introduced into the casing 3 from the steam inlet 3a. The rotor 4 is rotationally driven around the central axis O by the steam introduced into the casing 3. For example, a generator 9 is connected to the rotor shaft 6 of the rotor 4. The rotation of the rotor shaft 6 is transmitted to the generator 9, so that the generator 9 generates electricity.

Configuration of Steam Valve

The steam valve 20 is provided in a steam supply pipe 10 that connects a steam supply source (not shown) and the steam inlet 3a of the steam turbine 2. The steam valve 20 interrupts the flow of steam that is supplied to the steam inlet 3a through the steam supply pipe 10. The steam valve 20 may adjust the flow rate of steam that is supplied to the steam inlet 3a through the steam supply pipe 10.

Figure 2:
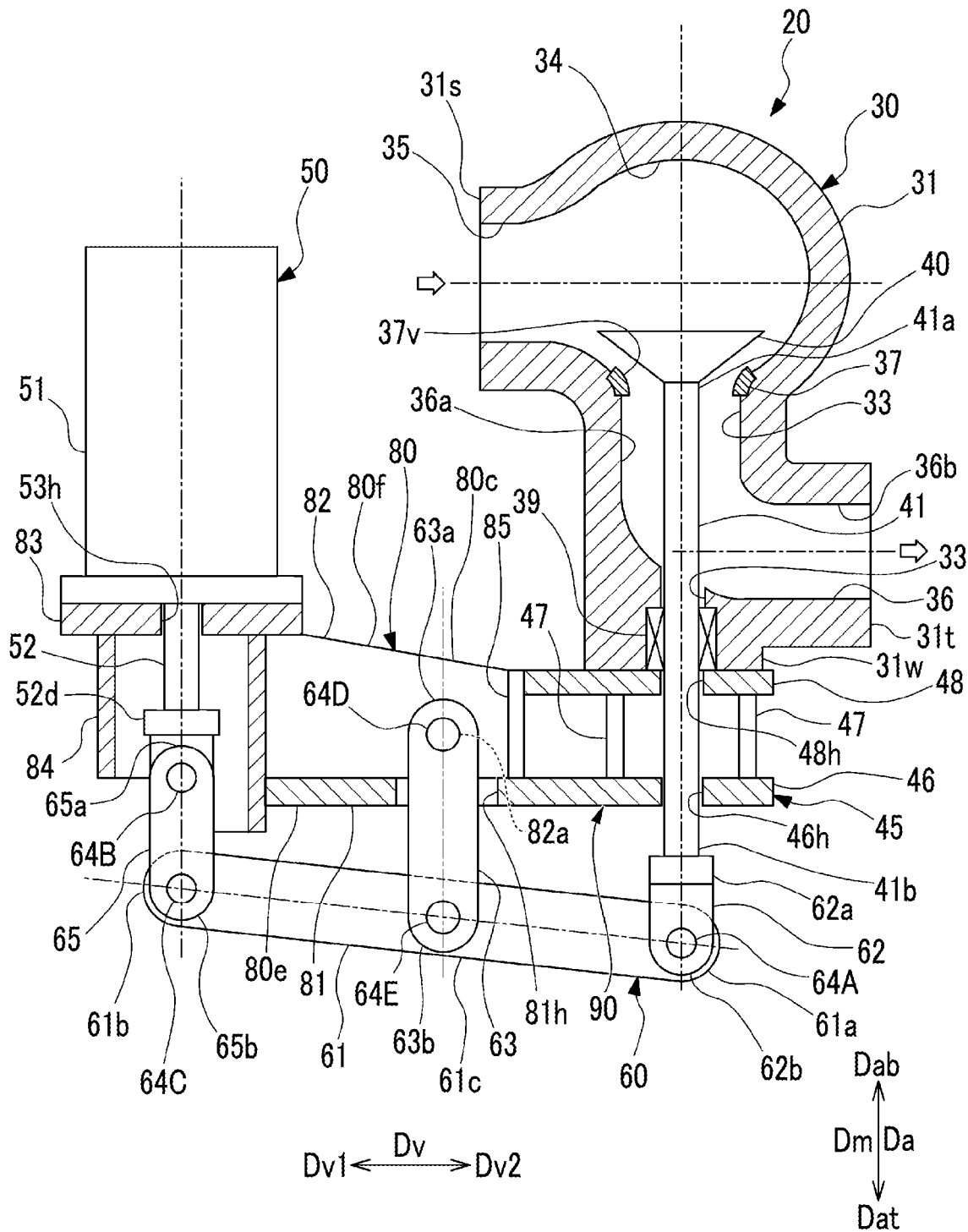
FIG. 2 is a sectional view showing a configuration of a steam valve according to the embodiment of the present disclosure.

As shown in FIG. 2, the steam valve 20 includes a valve casing 30, a valve body 40, a valve stem 41, an actuator 50, a heat buffer member 45, a link mechanism 60, and a link base 80. In the present embodiment, a link support component 90 is configured to include the heat buffer member 45 and the link base 80.

Configuration of Valve Casing

The valve casing 30 includes a casing main body 31. A flow path 33 for steam is formed inside the casing main body 31. The flow path 33 includes a valve chest 34, a steam inlet flow path portion 35, and a steam outlet flow path portion 36.

The valve chest 34 accommodates the valve body 40.

The steam inlet flow path portion 35 is formed so as to make an inlet-side outer surface 31s of the casing main body 31 and the valve chest 34 communicate with each other. In the embodiment of the present disclosure, the inlet-side outer surface 31s faces a first side Dv1 in an axis-perpendicular direction Dv orthogonal to an axial direction Da in which the valve stem 41 (described later) extends. The steam inlet flow path portion 35 extends from the valve chest 34 toward the first side Dv1 in the axis-perpendicular direction Dv and is open at the inlet-side outer surface 31s. Steam is supplied from the steam supply source (not shown) to the steam inlet flow path portion 35.

The steam outlet flow path portion 36 is formed so as to make an outlet-side outer surface 31t of the casing main body 31 and the valve chest 34 communicate with each other. In the embodiment of the present disclosure, the outlet-side outer surface 31t faces a second side Dv2 in the axis-perpendicular direction Dv. The steam outlet flow path portion 36 has an outlet first flow path portion 36a extending in the axial direction Da from the valve chest 34, and an outlet second flow path portion 36b that is continuous with the outlet first flow path portion 36a and that extends toward the second side Dv2 in the axis-perpendicular direction Dv. The outlet second flow path portion 36b is open on the outlet-side outer surface 31t. A tubular valve seat member 37 is provided in the steam outlet flow path portion 36. A valve seat 37v formed so as to face the inside of the valve chest 34 is formed in the valve seat member 37. The steam supplied from the steam supply source (not shown) through the steam supply pipe 10 passes through the steam inlet flow path portion 35, the valve chest 34, and the steam outlet flow path portion 36, which configure the flow path 33, and is sent to the steam inlet 3a of the steam turbine 2.

In the casing main body 31, a valve stem insertion hole 32 is formed in a casing outer wall portion 31w on the side where the steam outlet flow path portion 36 is formed, with respect to the valve chest 34 in the axial direction Da. The valve stem insertion hole 32 penetrates the casing outer wall portion 31w in the axial direction Da.

Configuration of Valve Body

The valve body 40 is provided within the valve chest 34. The valve body 40 is provided to be linearly movable along the axial direction Da (a moving direction Dm) in the valve chest 34 so as to come into contact with and be separated from the valve seat 37v of the valve seat member 37. The valve body 40 closes the flow path 33 in a state of being in contact with the valve seat 37v. The valve body 40 opens the flow path 33 by being separated from the valve seat 37v along the moving direction Dm. In this way, the valve body 40 opens and closes the flow path 33.

The valve body 40 is connected to the valve stem 41. The valve stem 41 extends in the axial direction Da (the moving direction Dm) of the valve body 40. The valve stem 41 has a base end portion 41a and a tip portion 41b. The base end portion 41a of the valve stem 41 is connected to the valve body 40. The tip portion 41b of the valve stem 41 penetrates the valve stem insertion hole 32 and is located outside the valve casing 30. The valve stem 41 is inserted inside a cylindrical bush 39 provided in the valve stem insertion hole 32. The valve stem 41 is in contact with an inner peripheral surface of the bush 39 and is supported to be reciprocable along the moving direction Dm of the valve body 40. The valve stem 41 is restrained from moving in a direction other than the moving direction Dm of the valve body 40 by the bush 39. The valve stem 41 reciprocates in the moving direction Dm, so that the valve body 40 linearly reciprocates in the moving direction Dm within the valve casing 30 to come into contact with and be separated from the valve seat 37v of the valve seat member 37.

Configuration of Heat Buffer Member

The heat buffer member 45 is mounted to the valve casing 30. The heat buffer member 45 is provided on the side where the valve stem 41 protrudes from the valve casing 30 to the outside of the valve casing 30, with respect to the valve casing 30. The heat buffer member 45 includes a base plate 48, a heat buffer plate 46, and a support column 47. The base plate 48 is mounted to the casing outer wall portion 31w of the valve casing 30. The base plate 48 has a plate shape orthogonal to the axial direction Da. The heat buffer plate 46 is disposed at an interval in the axial direction Da with respect to the valve casing 30 and the base plate 48. The heat buffer plate 46 is disposed to be separated from the valve casing 30 toward a tip side Dat out of the tip side Dat, which is the side of the tip portion 41b with respect to the base end portion 41a of the valve stem 41, and a base end side Dab on the side opposite to the tip side Dat, in the axial direction Da. The heat buffer plate 46 has a plate shape orthogonal to the axial direction Da. The support column 47 fixes the heat buffer plate 46 to be immovable relative to the valve casing 30. A plurality of support columns 47 are provided between the base plate 48 mounted to the valve casing 30 and the heat buffer plate 46. Each of the support columns 47 extends in the axial direction Da and connects the base plate 48 and the heat buffer plate 46. Insertion holes 48h and 46h into which the valve stem 41 is inserted are formed in the base plate 48 and the heat buffer plate 46, respectively.

Configuration of Link Base

The link base 80 is fixed to the heat buffer member 45. The link base 80 extends from the heat buffer member 45 toward the first side Dv1 in the axis-perpendicular direction Dv perpendicular to the axial direction Da. The link base 80 has separation members 81 and 82, an actuator fixing plate 83, and a tubular wall portion 84 in an integrated manner. The separation members 81 and 82 include a bedplate 81 and a rib plate 82. The bedplate 81 is formed to be continuous with the heat buffer plate 46 of the heat buffer member 45. The bedplate 81 has a plate shape orthogonal to the axial direction Da. The bedplate 81 is provided with a link insertion hole 81h into which an intermediate link 63 is inserted. The rib plate 82 is formed on the base end side Dab with respect to the bedplate 81 in the axial direction Da. The rib plate 82 extends orthogonally to the bedplate 81 in the axis-perpendicular direction Dv. One end of the rib plate 82 is joined to the heat buffer plate 46 of the heat buffer member 45 through an end plate 85. The actuator fixing plate 83 is mounted to an actuator casing 51 of the actuator 50 (described later). The actuator fixing plate 83 has a plate shape orthogonal to the axial direction Da. The actuator fixing plate 83 is provided with a rod insertion hole 53h into which an actuator rod 52 (described later) is inserted. The tubular wall portion 84 extends from the actuator fixing plate 83 toward the tip side Dat in the axial direction Da. The tubular wall portion 84 has a tubular shape having a rectangular or circular cross section when viewed from the axial direction Da. The rib plate 82 is welded to the second side Dv2 in the axis-perpendicular direction Dv of the tubular wall portion 84. Therefore, the actuator fixing plate 83 described above is indirectly fixed to the end portions on the first side of the separation members 81 and 82. The actuator rod 52 is accommodated in the tubular wall portion 84. The actuator fixing plate 83 may be directly fixed to the end portions on the first side of the separation members 81 and 82.

Configuration of Actuator

The actuator 50 moves the valve stem 41 along the moving direction Dm of the valve body 40. The actuator 50 is a hydraulic cylinder, an electric actuator, or the like. The actuator 50 includes the actuator casing 51 and the actuator rod 52. The actuator casing 51 is fixed to the link base 80. The actuator casing 51 is disposed on the base end side Dab with respect to an edge 80e on the tip side Dat of the link base 80. The actuator casing 51 is disposed on the base end side Dab with respect to the link base 80 in the axial direction Da. That is, the actuator 50 and the steam valve 20 are disposed on the same side with respect to the link base 80. The actuator rod 52 extends along the axial direction Da from the inside of the actuator casing 51. The actuator rod 52 moves along the axial direction Da with respect to the actuator casing 51.

Configuration of Link Mechanism

The link mechanism 60 transmits an operation of the actuator 50 to the valve stem 41. The link mechanism 60 includes a lever 61, a valve stem link 62, the intermediate link 63, and an actuator link 65. The link mechanism 60 is disposed on the tip side Dat with respect to an edge 80f on the base end side Dab of the link base 80.

The lever 61 has a lever first end portion 61a, a lever second end portion 61b, and an intermediate portion 61c between the lever first end portion 61a and the lever second end portion 61b. The lever 61 extends in a direction intersecting the axial direction Da.

The valve stem link 62 extends in a direction connecting the tip portion 41b of the valve stem 41 and the lever first end portion 61a. The valve stem link 62 has a valve stem link first end portion 62a and a valve stem link second end portion 62b. The valve stem link first end portion 62a of the valve stem link 62 is mounted to the tip portion 41b of the valve stem 41. The valve stem link second end portion 62b of the valve stem link 62 is pin-joined to the lever first end portion 61a of the lever 61 through a connection pin 64A so as to be rotatable around the connection pin 64A.

The intermediate link 63 extends in a direction connecting a base intermediate portion 80c of the link base 80 and the intermediate portion 61c of the lever 61. The intermediate link 63 has an intermediate link first end portion 63a and an intermediate link second end portion 63b. The intermediate link first end portion 63a of the intermediate link 63 is pin-joined to the base intermediate portion 80c of the link base 80 through a connection pin 64D so as to be rotatable around the connection pin 64D. The base intermediate portion 80c has the rib plate 82 that is a part of the link base 80. Therefore, the rib plate 82 is provided with a pin mounting portion 82a to which the connection pin 64D is mounted. The intermediate link first end portion 63a of the intermediate link 63 is pin-joined to the rib plate 82. The intermediate link second end portion 63b of the intermediate link 63 is pin-joined to the intermediate portion 61c of the lever 61 through a connection pin 64E so as to be rotatable around the connection pin 64E.

The actuator link 65 extends in a direction connecting a bracket 52d provided at a tip portion of the actuator rod 52 and the lever second end portion 61b of the lever 61. The actuator link 65 has an actuator link first end portion 65a and an actuator link second end portion 65b. The actuator link first end portion 65a of the actuator link 65 is pin-joined to the bracket 52d provided at the tip portion of the actuator rod 52 through a connection pin 64B so as to rotatable around the connection pin 64B. The bracket 52d is provided as a part of the actuator rod 52. The actuator link second end portion 65b of the actuator link 65 is pin-joined to the lever second end portion 61b of the lever 61 through a connection pin 64C so as to rotatable around the connection pin 64C.

Figure 3:
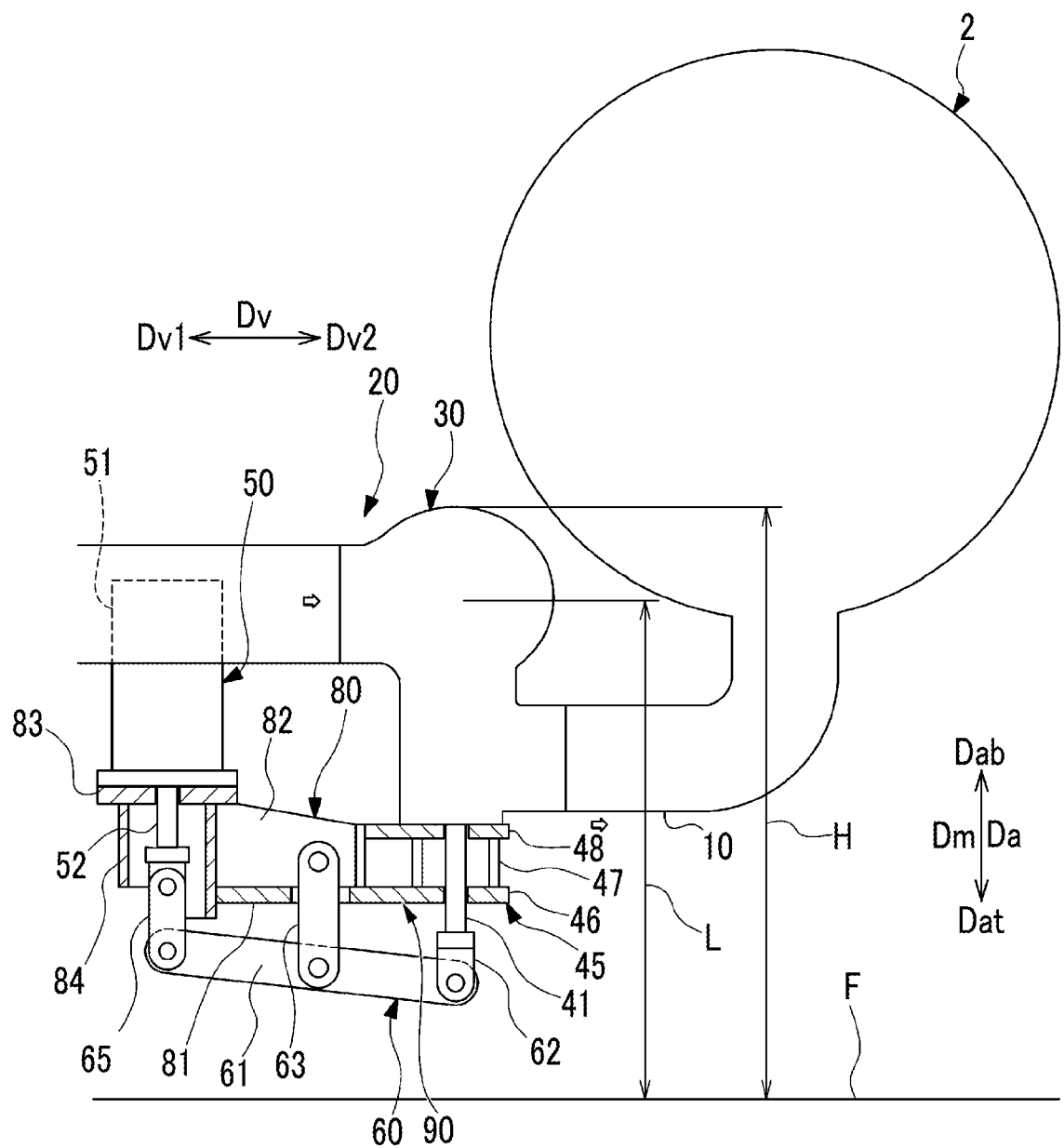
FIG. 3 is an explanatory diagram showing disposition of the steam valve with respect to a steam turbine in the embodiment of the present disclosure.

As shown in FIGS. 2 and 3, in the steam valve 20, the valve casing 30 and the actuator 50 are provided on an upper side with respect to the link base 80 and the link mechanism 60. That is, the steam valve 20 is installed such that the tip side Dat is on a lower side.

Operation of Steam Valve

The steam valve 20 as described above moves the valve stem 41 and the valve body 40 in the moving direction Dm along the axial direction Da by swinging the lever 61 via the operation of the actuator 50. When the actuator rod 52 of the actuator 50 is moved (appears) along the moving direction Dm from the actuator casing 51, the lever 61 swings with the intermediate portion 61c of the lever 61 as the center. In this way, the valve stem 41 connected to the lever first end portion 61a of the lever 61 through the valve stem link 62 moves in the moving direction Dm of the valve body 40. Accordingly, the valve body 40 comes into contact with and is separated from the valve seat 37v to open and close the flow path 33.

Operation and Effects

In the steam valve 20 of the above embodiment, since the heat buffer member 45 is provided at the valve casing 30, the heat of the valve casing 30 whose temperature has risen due to the steam heat is transmitted to the heat buffer member 45, and some of the heat is dissipated into the atmosphere. Further, since the heat buffer member 45 includes the heat buffer plate 46 fixed at a position away from the valve casing 30 toward the tip side Dat by the support column 47, due to the heat buffer plate 46, it is possible to restrain the heat from the valve casing 30 from reaching the tip side Dat of the valve stem 41 from the valve casing 30. In this way, the heat that is transmitted to the link mechanism 60 can be suppressed, and thus the thermal expansion of the link mechanism 60 can be suppressed.

As a result, it becomes possible to suppress the occurrence of malfunction of the steam valve 20 due to the influence of heat.

In a case where the actuator casing 51 is fixed to a portion provided separately from the valve casing 30, such as a floor surface, for example, without using the link base 80, the distance in the axis-perpendicular direction Dv between the actuator casing 51 and the valve casing 30 is fixed. Then, in a case where the link mechanism 60 is thermally deformed in the axis-perpendicular direction Dv due to the heat from the valve casing 30, stress due to the thermal deformation occurs in the link mechanism 60 because the distance in the axis-perpendicular direction Dv between the actuator casing 51 and the valve casing 30 is fixed.

In contrast, in a case where the actuator casing 51 is fixed to the link base 80, the heat from the valve casing 30 is transmitted to the link base 80 through the heat buffer member 45. Therefore, the link base 80 itself undergoes thermal deformation due to the heat that is transmitted from the heat buffer member 45. In this manner, the actuator casing 51 is fixed to the link base 80 where thermal deformation occurs, so that the difference in the amount of deformation from the thermal deformation that occurs in the link mechanism 60 becomes small. Therefore, the difference between the amount of displacement due to the thermal deformation that occurs in the link mechanism 60 and the amount of relative displacement between the valve body 40 (the valve stem 41) and the actuator casing 51 becomes small. Therefore, it is possible to restrain stress due to a thermal deformation force from being applied to the link mechanism 60. As a result, it becomes possible to suppress the occurrence of malfunction of the steam valve 20 due to the influence of heat.

Further, in the steam valve 20, the valve stem link first end portion 62a of the valve stem link 62 is mounted to the tip portion 41b of the valve stem 41. The valve stem link second end portion 62b of the valve stem link 62 is pin-joined to the lever first end portion 61a of the lever 61. The intermediate link first end portion 63a of the intermediate link 63 is pin-joined to the link base 80. The intermediate link second end portion 63b of the intermediate link 63 is pin-joined to the intermediate portion 61c between the lever first end portion 61a and the lever second end portion 61b of the lever 61. The actuator link first end portion 65a of the actuator link 65 is pin-joined to the actuator rod 52. The actuator link second end portion 65b of the actuator link 65 is pin-joined to the lever second end portion 61b of the lever 61.

Therefore, when the actuator rod 52 is moved along the axial direction Da, the lever 61 swings with the intermediate portion 61c of the lever 61 as the center. In this way, the valve stem 41 connected to the lever first end portion 61a of the lever 61 through the valve stem link 62 moves in the moving direction Dm of the valve body 40 to open and close the flow path 33 via the valve body 40. At this time, even if the lever 61 swings due to the movement of the actuator rod 52, the displacement in the direction intersecting the moving direction Dm of the valve body 40 does not occur at the lever first end portion 61a of the lever 61 pin-joined to the valve stem link second end portion 62b of the valve stem link 62. In a case where the lever 61 swings, the displacement in the direction intersecting the moving direction Dm of the actuator rod 52, which occurs in the lever 61, occurs in the pin joint portion between the intermediate link 63 and the lever 61 and the pin joint portion between the actuator link 65 and the lever 61, and is absorbed by the rotation of the intermediate link 63 and of the actuator link 65.

Further, in the steam valve 20, the actuator casing 51 is disposed on the base end side Dab with respect to the edge 80e on the tip side Dat of the link base 80. In this way, the actuator casing 51 is provided on the same side as the valve body 40 with respect to the link base 80 in the axial direction Da. In this manner, the actuator casing 51 and the valve body 40 are provided on the same side with respect to the link base 80 in the axial direction Da, so that it is possible to reduce the height dimension in the axial direction Da of the steam valve 20.

Further, in the steam turbine equipment 1, since the steam valve 20 as described above is provided, it becomes possible to suppress the occurrence of malfunction of the steam valve 20 due to the influence of heat.

Further, in the steam turbine equipment 1, since the tip side Dat of the steam valve 20 is installed so as to be on the lower side, the actuator casing 51 and the valve body 40 are disposed on the upper side with respect to the link base 80. In this way, since the steam valve 20 can be disposed downward on the lower side, an installation level L of the steam valve 20 from an installation surface F and a maximum height H of the steam valve 20 can be kept low. Along with this, the installation height of the steam turbine 2 can also be kept low.

Additional Remarks

The steam valve 20 according to the embodiment and the steam turbine equipment 1 provided with the steam valve are understood as follows, for example.

(1) The steam valve 20 according to a first aspect includes: the valve casing 30 in which the flow path 33 for steam is formed inside; the valve body 40 that linearly reciprocates in the valve casing 30 to open and close the flow path 33; the valve stem 41 connected to the valve body 40; the actuator 50 that moves the valve stem 41; the heat buffer member 45 mounted to the valve casing 30; the link mechanism 60 that transmits the operation of the actuator 50 to the valve stem 41; and the link base 80 that supports the link mechanism 60, in which the valve stem 41 has the base end portion 41a connected to the valve body 40 and the tip portion 41b located outside the valve casing 30, and extends in the moving direction Dm of the valve body 40 from the base end portion 41a, the heat buffer member 45 includes the heat buffer plate 46 separated from the valve casing 30 toward the tip side Dat, which is the side of the tip portion 41b with respect to the base end portion 41a in the axial direction Da in which the valve stem 41 extends, out of the tip side Dat and the base end side Dab on the side opposite to the tip side Dat, and the support column 47 that fixes the heat buffer plate 46 to be immovable relative to the valve casing 30, the actuator 50 includes the actuator casing 51, and the actuator rod 52 that extends in the axial direction Da from the inside of the actuator casing 51 and that moves in the axial direction Da with respect to the actuator casing 51, the link base 80 is fixed to the heat buffer member 45 and extends from the heat buffer member 45 in the axis-perpendicular direction Dv perpendicular to the axial direction Da, the actuator casing 51 is fixed to the link base 80, and the link mechanism 60 is disposed on the tip side Dat with respect to the edge 80f on the base end side Dab of the link base 80.

In the steam valve 20, since the heat buffer member 45 is provided at the valve casing 30, the heat of the valve casing 30 whose temperature has risen due to the steam heat is transmitted to the heat buffer member 45, and some of the heat is dissipated into the atmosphere. Further, since the heat buffer member 45 includes the heat buffer plate 46 fixed at a position away from the valve casing 30 toward the tip side Dat by the support column 47, due to the heat buffer plate 46, it is possible to restrain the heat from the valve casing 30 from reaching the tip side Dat of the valve stem 41 from the valve casing 30. In this way, the heat that is transmitted to the link mechanism 60 can be suppressed, and thus the thermal expansion of the link mechanism 60 can be suppressed.

Further, the link base 80 to which the actuator casing 51 of the actuator 50 is fixed is fixed to the heat buffer member 45. The heat from the valve casing 30 is transmitted to the link base 80 through the heat buffer member 45. Therefore, the link base 80 undergoes thermal deformation due to heat that is transmitted from the heat buffer member 45. Therefore, compared to a case where the actuator casing 51 is fixed to a portion provided separately from the valve casing 30, such as a floor surface, for example, the actuator casing 51 is fixed to the link base 80 where thermal deformation occurs, so that the difference in the amount of deformation from the thermal deformation that occurs in the link mechanism 60 becomes small. Therefore, the difference between the amount of displacement due to the thermal deformation that occurs in the link mechanism 60 and the amount of relative displacement between the valve body 40 (the valve stem 41) and the actuator casing 51 becomes small. Therefore, it is possible to restrain stress due to a thermal deformation force from being applied to the link mechanism 60. As a result, it becomes possible to suppress the occurrence of malfunction of the steam valve 20 due to the influence of heat.

(2) In the steam valve 20 according to a second aspect, in the steam valve 20 of the above (1), the link mechanism 60 includes the lever 61 having the lever first end portion 61a and the lever second end portion 61b, the valve stem link 62 having the valve stem link first end portion 62a and the valve stem link second end portion 62b, the intermediate link 63 having the intermediate link first end portion 63a and the intermediate link second end portion 63b, and the actuator link 65 having the actuator link first end portion 65a and the actuator link second end portion 65b, the valve stem link first end portion 62a of the valve stem link 62 is mounted to the tip portion 41b of the valve stem 41, the valve stem link second end portion 62b of the valve stem link 62 is pin-joined to the lever first end portion 61a of the lever 61, the intermediate link first end portion 63a of the intermediate link 63 is pin-joined to the link base 80, the intermediate link second end portion 63b of the intermediate link 63 is pin-joined to the intermediate portion 61c between the lever first end portion 61a and the lever second end portion 61b of the lever 61, the actuator link first end portion 65a of the actuator link 65 is pin-joined to the actuator rod 52, and the actuator link second end portion 65b of the actuator link 65 is pin-joined to the lever second end portion 61b of the lever 61.

In the steam valve 20 as described above, the valve stem link first end portion 62a of the valve stem link 62 is mounted to the tip portion 41b of the valve stem 41. The valve stem link second end portion 62b of the valve stem link 62 is pin-joined to the lever first end portion 61a. The intermediate link first end portion 63a of the intermediate link 63 is pin-joined to the link base 80. The intermediate link second end portion 63b of the intermediate link 63 is pin-joined to the intermediate portion 61c between the lever first end portion 61a and the lever second end portion 61b of the lever 61. The actuator link first end portion 65a of the actuator link 65 is pin-joined to the actuator rod 52. The actuator link second end portion 65b of the actuator link 65 is pin-joined to the lever second end portion 61b of the lever 61.

Therefore, when the actuator rod 52 is moved along the axial direction Da, the lever 61 swings with the intermediate portion 61c of the lever 61 as the center. In this way, the valve stem 41 connected to the lever first end portion 61a of the lever 61 through the valve stem link 62 moves in the moving direction Dm of the valve body 40 to open and close the flow path 33 via the valve body 40. At this time, even if the lever 61 swings due to the movement of the actuator rod 52, the displacement in the direction intersecting the moving direction Dm of the valve body 40 does not occur at the lever first end portion 61a of the lever 61 pin-joined to the valve stem link second end portion 62b of the valve stem link 62. In a case where the lever 61 swings, the displacement in the direction intersecting the moving direction Dm of the actuator rod 52, which occurs in the lever 61, occurs in the pin joint portion between the intermediate link 63 and the lever 61 and the pin joint portion between the actuator link 65 and the lever 61, and is absorbed by the rotation of the intermediate link 63 and of the actuator link 65.

(3) In the steam valve 20 according to a third aspect, in the steam valve 20 of the above (1) or (2), the actuator casing 51 is disposed on the base end side Dab with respect to an edge on the tip side Dat of the link base 80.

In this way, the actuator casing 51 is provided on the same side as the valve body 40 with respect to the link base 80 in the axial direction Da. In this manner, the actuator casing 51 and the valve body 40 are provided on the same side with respect to the link base 80 in the axial direction Da, so that it is possible to reduce the height dimension in the axial direction Da of the steam valve 20.

(4) The steam turbine equipment 1 according to a fourth aspect includes: the steam valve 20 according to any one of the above (1) to (3); and the steam turbine 2 that is driven by steam that has passed through the steam valve 20.

In this way, the steam turbine equipment 1 is provided with the steam valve 20 as described above, so that it becomes possible to suppress the occurrence of malfunction of the steam valve 20 due to the influence of heat.

(5) The steam turbine equipment 1 according to a fifth aspect includes: the steam valve 20 of the above (3); and the steam turbine 2 that is driven by steam that has passed through the steam valve 20, in which the steam valve 20 is installed such that the tip side Dat is on the lower side.

In this way, the steam turbine equipment 1 is provided with the steam valve 20 as described above, so that it becomes possible to suppress the occurrence of malfunction of the steam valve 20 due to the influence of heat. Further, since the tip side Dat of the steam valve 20 is installed so as to be on the lower side, the actuator casing 51 and the valve body 40 are disposed on the upper side with respect to the link base 80. In this way, since the steam valve 20 can be disposed downward on the lower side, the installation height of the steam turbine 2 can also be kept low.

Further, the link support component 90 according to the embodiment is understood as follows, for example.

(6) The link support component 90 according to a sixth aspect is a link support component of the steam valve 20 that includes the valve casing 30 in which the flow path 33 for steam is formed inside, the valve body 40 that linearly reciprocates in the valve casing 30 to open and close the flow path 33, the valve stem 41 connected to the valve body 40, the actuator 50 that moves the valve stem 41, and the link mechanism 60 that transmits an operation of the actuator 50 to the valve stem 41.

The link support component 90 includes the heat buffer member 45 capable of being mounted to the valve casing 30, and the link base 80 capable of supporting the link mechanism 60. The heat buffer member 45 includes the heat buffer plate 46 separated from the valve casing 30 toward the tip side Dat out of the tip side Dat and the base end side Dab in the axial direction Da in which the valve stem 41 extends, and the support column 47 that extends in the axial direction Da and that fixes the heat buffer plate 46 to be immovable relative to the valve casing 30. The heat buffer plate 46 is provided with the insertion hole 46h which penetrates in the axial direction Da, and into which the valve stem 41 is capable of being inserted. The link base 80 includes the separation members 81 and 82 fixed to the heat buffer member 45 and extending from the heat buffer member 45 toward the first side Dv1 in the axis-perpendicular direction Dv perpendicular to the axial direction Da, and the actuator fixing plate 83 that is directly or indirectly fixed to end portions on the first side Dv1 of the separation members 81 and 82, and to which the casing 51 of the actuator 50 is capable of being fixed. The actuator fixing plate 83 is provided with the rod insertion hole 53h which penetrates in the axial direction Da, and into which the actuator rod 52 of the actuator 50 is capable of being inserted. The separation members 81 and 82 are provided with the pin mounting portion 82a to which the pin 64D for rotatably supporting one link 63 of the link mechanism 60 is mounted.

INDUSTRIAL APPLICABILITY

In the steam valve according to an aspect of the present disclosure, it is possible to suppress the occurrence of malfunction due to the influence of heat.

REFERENCE SIGNS LIST

1: steam turbine equipment
2: steam turbine
3: casing
3a: steam inlet
3b: steam outlet
4: rotor
5: stator blade row
6: rotor shaft
7: rotor blade row
8A, 8B: bearing
9: generator
10: steam supply pipe
20: steam valve
30: valve casing
31: casing main body
31s: inlet-side outer surface
31t: outlet-side outer surface
31w: casing outer wall portion
32: valve stem insertion hole
33: flow path
34: valve chest
35: steam inlet flow path portion
36: steam outlet flow path portion
36a: outlet first flow path portion
36b: outlet second flow path portion
37: valve seat member
37v: valve seat
39: bush
40: valve body
41: valve stem
41a: base end portion 41b: tip portion
45: heat buffer member
46: heat buffer plate
46h: insertion hole
47: support column
48: base plate
48h: insertion hole
50: actuator
51: actuator casing
52: actuator rod
52d: bracket
53h: rod insertion hole
60: link mechanism
61: lever
61a: lever first end portion
61b: lever second end portion
61c: intermediate portion
62: valve stem link
62a: valve stem link first end portion
62b: valve stem link second end portion
63: intermediate link
63a: intermediate link first end portion
63b: intermediate link second end portion
64A, 64B, 64C, 64D, 64E: connection pin
65: actuator link
65a: actuator link first end portion
65b: actuator link second end portion
80: link base
80c: base intermediate portion
80e: edge
80f: edge
81, 82: separation member
81: bedplate
81h: link insertion hole
82: rib plate
82a: pin mounting portion
83: actuator fixing plate
84: tubular wall portion
85: end plate
90: link support component
Da: axial direction
Dab: base end side
Dat: tip side
Dm: moving direction
Dv: axis-perpendicular direction
Dv1: first side
Dv2: second side
F: installation surface
H: maximum height
L: installation level
O: central axis

The invention claimed is:

1. A steam valve comprising:
a valve casing in which a flow path for steam is formed inside;
a valve body that linearly reciprocates in the valve casing to open and close the flow path;
a valve stem connected to the valve body;
an actuator that moves the valve stem;
a heat buffer member mounted to the valve casing;
a link mechanism that transmits an operation of the actuator to the valve stem; and
a link base that supports the link mechanism,
wherein the valve stem has a base end portion connected to the valve body and a tip portion located outside the valve casing, and extends in a moving direction of the valve body from the base end portion,
the heat buffer member includes a heat buffer plate separated from the valve casing toward a tip side, which is a side of the tip portion with respect to the base end portion in an axial direction in which the valve stem extends, out of the tip side and a base end side on a side opposite to the tip side, and a support column that fixes the heat buffer plate to be immovable relative to the valve casing,
the actuator includes an actuator casing, and an actuator rod that extends in the axial direction from an inside of the actuator casing and that moves in the axial direction with respect to the actuator casing,
the link base is fixed to the heat buffer member and extends from the heat buffer member in an axis-perpendicular direction perpendicular to the axial direction,
the actuator casing is fixed to the link base, and
the link mechanism is disposed on the tip side with respect to an edge on the base end side of the link base.

2. The steam valve according to claim 1,
wherein the link mechanism includes a lever having a lever first end portion and a lever second end portion, a valve stem link having a valve stem link first end portion and a valve stein link second end portion, an intermediate link having an intermediate link first end portion and an intermediate link second end portion, and an actuator link having an actuator link first end portion and an actuator link second end portion,
the valve stem link first end portion of the valve stem link is mounted to the tip portion of the valve stem,
the valve stem link second end portion of the valve stem link is pin-joined to the lever first end portion of the lever,
the intermediate link first end portion of the intermediate link is pin-joined to the link base,
the intermediate link second end portion of the intermediate link is pin-joined to an intermediate portion between the lever first end portion and the lever second end portion of the lever,
the actuator link first end portion of the actuator link is pin-joined to the actuator rod, and
the actuator link second end portion of the actuator link is pin-joined to the lever second end portion of the lever.

3. The steam valve according to claim 1,
wherein the actuator casing is disposed on the base end side with respect to an edge on the tip side of the link base.

4. Steam turbine equipment comprising:
the steam valve according to claim 1; and
a steam turbine that is driven by steam that has passed through the stearin valve.

5. Steam turbine equipment comprising:
the steam valve according to claim 3; and
a steam turbine that is driven by steam that has passed through the steam valve,
wherein the steam valve is installed such that the tip side is on a lower side.

6. A link support component of a steam valve that includes
a valve casing in which a flow path for steam is formed inside,
a valve body that linearly reciprocates in the valve casing to open and close the flow path,
a valve stein connected to the valve body,
an actuator that moves the valve stem, and
a link mechanism that transmits an operation of the actuator to the valve stem, the link support component comprising:
a heat buffer member capable of being mounted to the valve casing; and
a link base capable of supporting the link mechanism,
wherein the heat buffer member includes a heat buffer plate separated from the valve casing toward a tip side out of the tip side and a base end side in an axial direction in which the valve stem extends, and a support column that extends in the axial direction and that fixes the heat buffer plate to be immovable relative to the valve casing,
the heat buffer plate is provided with an insertion hole which penetrates in the axial direction, and into which the valve stem is capable of being inserted,
the link base includes a separation member fixed to the heat buffer member and extending from the heat buffer member toward a first side in an axis-perpendicular direction perpendicular to the axial direction, and an actuator fixing plate that is directly or indirectly fixed to an end portion on the first side of the separation member, and to Which a casing of the actuator is capable of being fixed,
the actuator fixing plate is provided with a rod insertion hole which penetrates in the axial direction, and into which an actuator rod of the actuator is capable of being inserted, and
the separation member is provided with a pin mounting portion to which a pin for rotatably supporting one link of the link mechanism is mounted.

* * * * *